(No Model.)
J. OTTER.
FISH TRAP.
No. 262,464. Patented Aug. 8, 1882.
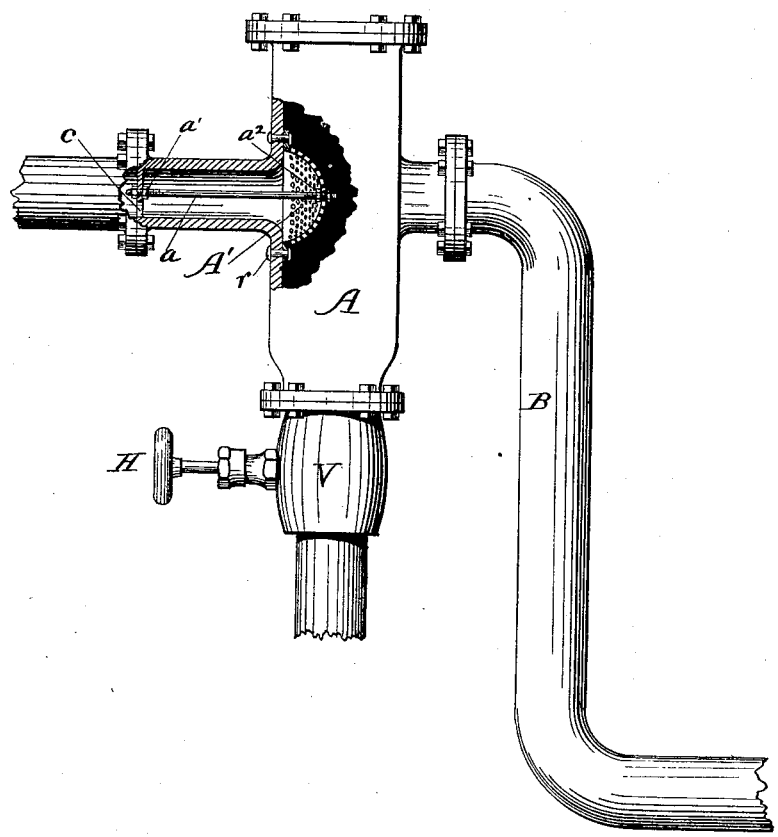
Witnesses
F. B. Townsend
Chas. E. Gaylord
Inventor
John Otter
By A M Stout
atty

UNITED STATES PATENT OFFICE.

JOHN OTTER, OF CHICAGO, ILLINOIS.

FISH-TRAP.

SPECIFICATION forming part of Letters Patent No. 262,464, dated August 8, 1882.

Application filed April 21, 1882. (No model.)

*To all whom it may concern:*

Be it known that I, JOHN OTTER, of the city of Chicago, county of Cook, and State of Illinois, have invented certain improvements in devices for preventing supply-pipes for running machinery from being blocked up by fish and other obstructions, of which the following is a specification.

My invention relates to the construction and the arrangement of the parts of a device to be used in supply-pipes through which columns of water may be forced to be used to actuate elevators or hoisting-machines, as well as other machines to which water-power may be adapted, in order that such pipes and their valves may not be blocked by fish and other solid matters, whether they be such as will either sink or swim in water.

My said invention will be fully described hereinafter with reference to the accompanying drawing, in which is represented an elevation, partly in section, of such a supply-pipe broken away at each end in connection with my new improvement.

In the drawing, A indicates a water-chamber, which is interposed between two sections of supply-pipe, B, as shown, at any point between the source of supply and the machine to be actuated by the column of water, and the chamber being provided with short connection-pipes, one on each side of it, as shown, the joints of the supply-pipe may be made by flanges, bolts, and nuts, as shown in the drawing, or in any other suitable manner. The water-chamber A may have any suitable length and diameter in proportion to the diameter of the supply-pipe; but the proportions shown in the drawing are deemed to be about the proper ones.

In order to prevent small fish and other solid matters which may come from the source of the water-supply, be it lake or river, from passing through the chamber and into the pipe B beyond the chamber A, I have devised a perforated diaphragm, A', having its convex side in the direction from which the water comes and fastened upon the wall of the chamber on its inner side around and over the opening or pipe-connection, through which the column of water passes out after having entered the chamber from the source of supply, as shown in the drawing. The diaphragm may be fastened to the walls of the chamber A by means of rivets $r$ through its flange, as shown, or otherwise. The diaphragm A' will exclude fish and other solid matters which may be too large to pass through its perforations. The chamber is made much larger than the supply-pipe, and its side walls stand perpendicular to those of the pipe, so that it affords space for water above, below, and on each side of the stream of water, which forces its way through the center of the chamber, so that lighter solid matters coming into it with the water will rise above the stream and heavier ones will sink below it and leave the perforations of the diaphragm A' free and open for the passage of the water. The solid matters which cannot pass through them will be drawn by the current itself into the dead and eddying water in the chamber surrounding the stream, and when such dead water becomes full of them the chamber may be emptied of them by means of a valve in seat V in the lower part of the chamber, as shown, into the sewer or other receptacle and then closed again.

If found to be expedient, the supply-pipe may be provided with valves on either side of the chamber, by means of which the stream of water may be cut off while the chamber is being emptied.

In order to secure the diaphragm firmly in position, and to enable it better to withstand the pressure of the column of water against it, I have devised the rod $a$, having screw-nuts $a^2$ on each side of the diaphragm at its apex in one end and at its other end attached in the same manner at $a'$ to cross-bar $c$, having its bearings in the connection-pipe. I do not confine myself entirely to the convex form in the diaphragm, but consider that form as best, because it will induce solid matters, when thrown against it, to glance off into the eddying water; but the need and the efficiency of my device have been demonstrated by actual experiment.

I am aware that T. D. Bond, in the Letters Patent of the United States issued to him for a water-pipe trap, bearing date April 7, 1863, has described and shown an enlargement of a supply-pipe without a change of form and having a perforated plate across its interior, and that combination I hereby disclaim; but What I do claim as my invention, and desire to secure by Letters Patent, is—

The chamber A, having its side walls to stand at right angles to those of the supply-pipe B and affording water-space for fish and other solid matters above, below, and on each side of the column of water passing through the supply-pipe, in combination with perforated diaphragm A', substantially as and for the purpose described.

JOHN OTTER.

Witnesses:
ABEL BOND,
M. M. DUVALL.